(12) United States Patent
Kimura et al.

(10) Patent No.: US 6,816,195 B2
(45) Date of Patent: Nov. 9, 2004

(54) ELECTRONIC STILL CAMERA

(75) Inventors: Masanobu Kimura, Kanagawa-ken (JP); Hiroaki Kotaki, Kanagawa-ken (JP); Tadashi Sugiki, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 781 days.

(21) Appl. No.: 09/827,347

(22) Filed: Apr. 6, 2001

(65) Prior Publication Data

US 2002/0039145 A1 Apr. 4, 2002

(30) Foreign Application Priority Data

Oct. 2, 2000 (JP) ........................................ 2000-302002

(51) Int. Cl.$^7$ .............................................. H04N 5/217
(52) U.S. Cl. ........................ 348/241; 348/243; 348/296
(58) Field of Search ........................ 348/333.11, 222.1, 348/230.1, 220.1, 241, 243, 248, 249, 250, 298, 294, 296, 297, 311, 312, 313

(56) References Cited

U.S. PATENT DOCUMENTS

| | | | | |
|---|---|---|---|---|
| 4,561,749 A | * | 12/1985 | Utagawa ...................... 396/101 |
| 4,910,599 A | | 3/1990 | Hashimoto |
| 5,235,428 A | * | 8/1993 | Hirota et al. ................ 348/355 |
| 5,325,146 A | * | 6/1994 | Toji ............................. 396/81 |
| 5,513,011 A | * | 4/1996 | Matsumoto et al. .......... 386/98 |
| 5,572,155 A | * | 11/1996 | Tamayama ................... 327/94 |
| 5,623,309 A | * | 4/1997 | Yoshimura et al. .......... 348/355 |
| 5,694,168 A | * | 12/1997 | Toji ............................. 348/350 |
| 5,764,611 A | * | 6/1998 | Watanabe .................... 386/113 |
| 6,130,420 A | * | 10/2000 | Tanaka et al. ............ 250/208.1 |
| 6,271,883 B1 | * | 8/2001 | Iijima et al. ................. 348/345 |
| 6,456,325 B1 | * | 9/2002 | Hayashi ....................... 348/234 |

FOREIGN PATENT DOCUMENTS

| | | |
|---|---|---|
| JP | 63-245074 | 10/1988 |
| JP | 7-203311 | 8/1995 |
| JP | 9-322072 | 12/1997 |
| JP | 11146409 A | 5/1999 |
| JP | 11-146409 | 5/1999 |

* cited by examiner

*Primary Examiner*—Tuan Ho
*Assistant Examiner*—Yogesh Aggarwal
(74) *Attorney, Agent, or Firm*—Pillsbury Winthrop LLP

(57) ABSTRACT

An electronic still camera for determining photographing conditions from output of the solid-state imaging device by the preparative photographing operation prior to actual photographing operation and generating an actual photographing image from an output signal of the solid-state imaging device based on the photographing conditions, characterized by that the electronic camera has the solid-state imaging device, the means for reducing the read-out rate of a image signal from the solid-state imaging device at the actual photographing operation lower than the read-out rate of a image signal from the solid-state imaging device at the preparative photographing operation, and the band-width changing means for reducing the signal passing band-width at the actual photographing operation narrower than the signal passing band-width at the preparative photographing operation in the image signal path from the solid-state imaging device.

3 Claims, 4 Drawing Sheets

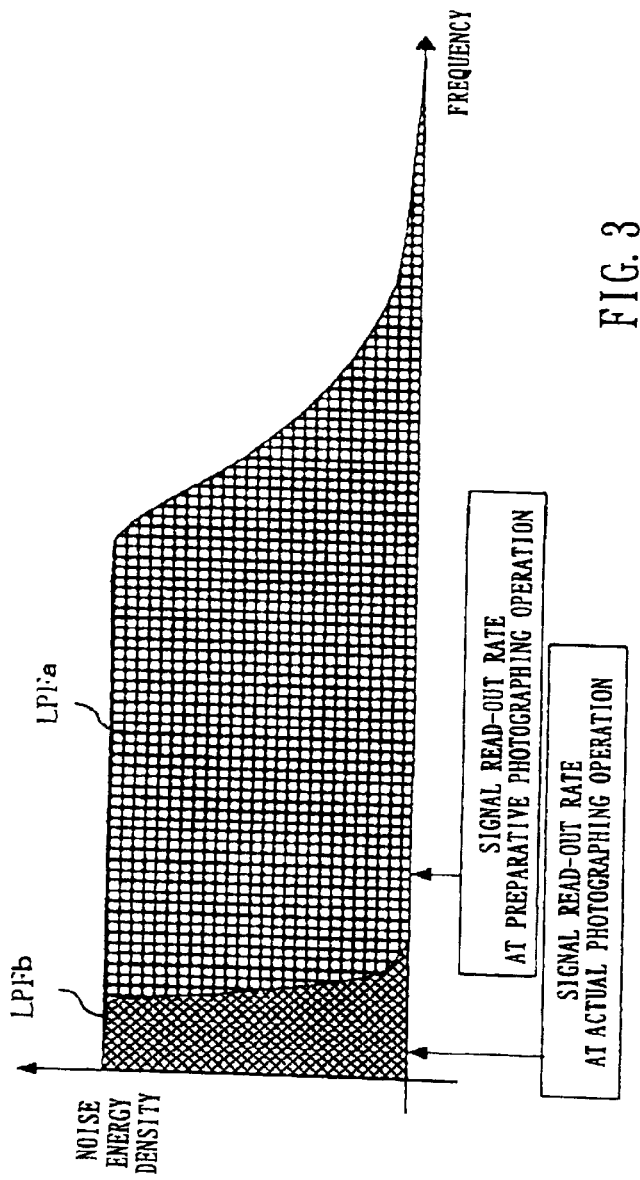
FIG. 3
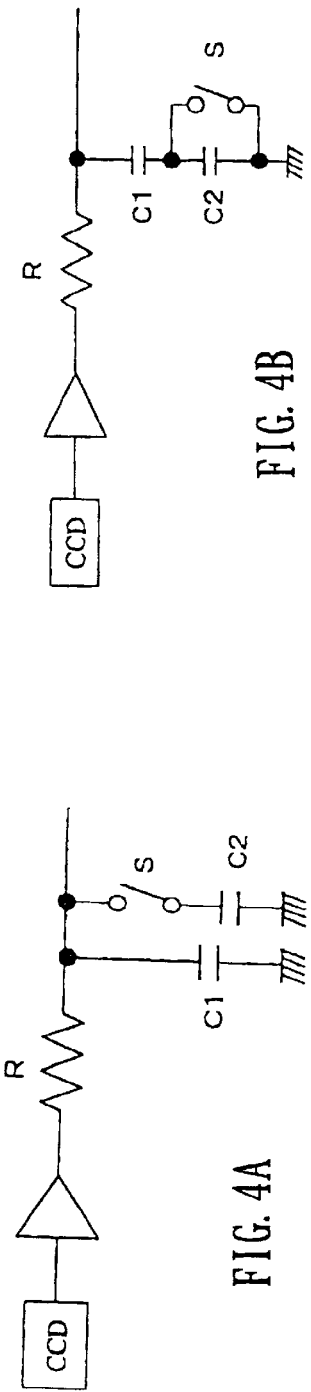
FIG. 4A
FIG. 4B

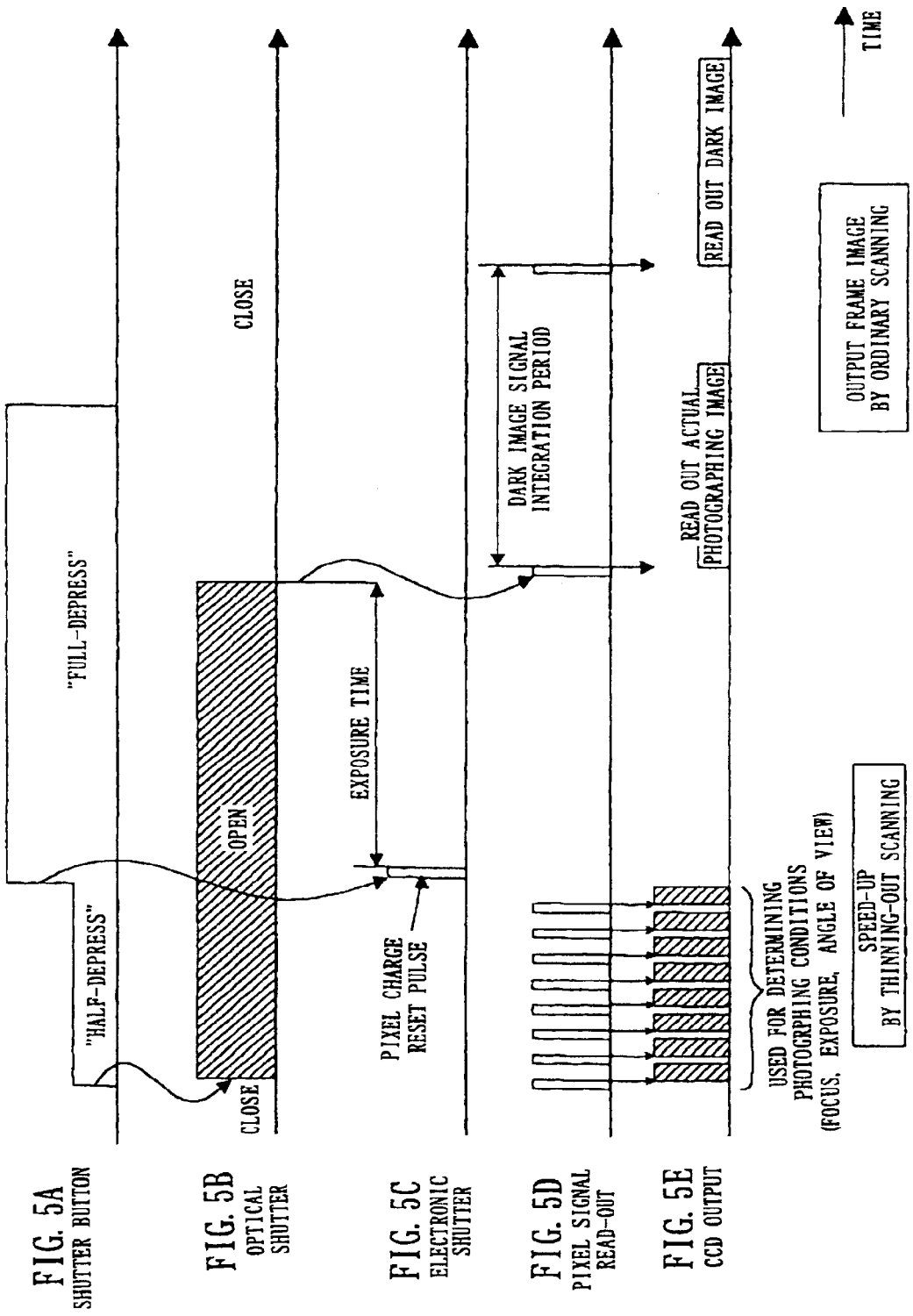

ELECTRONIC STILL CAMERA

FIELD OF THE INVENTION

The present invention relates to an electronic still camera and more particularly to an electronic still camera of a two-stage operation shutter type.

BACKGROUND OF THE INVENTION

In a conventional electronic still camera, when a camera operator operates a shutter button, a two-stage operation wherein the shutter button is "half-depressed" first, and "full-depressed" after that.

In the electronic still camera of such a two-stage operation shutter type, while the shutter button is in a "half-depressed" state, the operation of automatically determining photographing conditions such as exposure conditions and white balance (hereinafter referred to as preparative photographing) is carried out. In the preparative photographing operation, various photographing conditions such as a focusing an exposure, an angle of view, and others must be set, so that several times of the photographing operation are carried out at a high speed. When the shutter button is "full-depressed", an actual operation for writing photographic images into the memory (hereinafter the operation is referred to as actual photographing) under the photographing conditions set by the preparative photographing operation is carried out.

Various data obtained in the preparative photographing may be used by a camera operator as reference data for manual-setting of photographing conditions.

Conventionally, in such electronic still cameras, in both of the preparative photographing and the actual photographing, an optical image of a subject is formed on an imaging surface of a solid-state imaging device such as a charge-coupled device in a similar manner. A timing pulse is applied to the solid-state imaging device from a driver such as a CCD driver at a predetermined rate, and thus a image signal photo-electrically transduced by the solid-state imaging device is read out therefrom in accordance with the timing pulse. This image signal is forwarded to a signal processor, and wherein the image signal is subjected to various signal processings according to the timing pulse at the same predetermined rate. That is, in the preparative photographing operation, a signal processing for automatically determining some photographing conditions such as an exposure condition, a white balance etc, are carried out in this signal processing stage. On the other hand, in this photographing operation, the image signal obtained from the optical image formed under the photographing conditions set by the preparative photographing operation in this signal processing stage is processed so as to be put into practical use.

In the electronic still camera of a two-stage operation shutter type, when a camera operator depresses the shutter button at a stroke, at the depressing-down stroke, the time in the preparative photographing state is very short. Nevertheless, as described above, several photographing operations must be carried out in the short time, so that the timing pulse is unavoidably at a comparatively high pulse rate.

Therefore, conventionally, reading out of the image signal at the time of actual photographing operation and various signal processes are so configured as to be carried out according to the timing pulse at the high rate.

Japanese Patent Application Laid-Open 11-146409 discloses an art for reducing the signal read-out rate at a image photographing operation by a image camera lower than the signal read-out rate at a preview operation. However, the art disclosed in this patent application is used to reduce the crosstalk between image signals in a case of insufficient ringing or frequency characteristics of the analog signal system at the image photographing operation and a defect occurs that it adversely affects the control mechanism based on the signal level of automatic white balance because the crosstalk between signals is different between preview and image photographing operation.

In an electronic still camera using a CCD as a solid-state imaging device, conventionally, the reference voltage for changing an output signal of the CCD by a correlation double sampler and a signal voltage generated on it are sampled respectively and the noise component is removed by taking off the difference between them.

However, in such a low-noise art of a sampling system, a noise component in the high frequency band at time random is generated by the output amplifier of the CCD and the noise component is folded on the frequency band effective as an image signal at a sampling operation as a harmful noise. Therefore, for the purpose of removing the noise component in the high frequency band, a low-pass filter having a cut-off frequency about three times of the signal transfer frequency is conventionally used.

However, one fixed image is obtained from the electronic still camera and on such a fixed image, the noise component in the high frequency band at time random generated by the amplifier is also generated in a fixed state, so that a defect occurs that no sufficient noise reduction effect can be obtained.

In a conventional electronic still camera of a two-stage operation shutter type, in relation to the preparative photographic process as described above, reading out of the image signal at the actual photographing operation and various signal processes are carried out at a comparatively high pulse rate. However, when reading out of the image signal and various signal processes are carried out at such a high pulse rate, in the noise reduction art by correlation double sampling, a defect occurs that the noise component in the high frequency band appears on an image in a fixed state and no sufficient noise reduction effect can be obtained.

SUMMARY OF THE INVENTION

An object according to the present invention is to solve the conventional problem and to provide an electronic still camera for obtaining an image with a satisfactory SN ratio.

A first aspect of the electronic still camera according to the present invention, to solve the problem, is an electronic camera for determining photographing conditions from output of a solid-state imaging device prior to an actual photographing operation and generating a photographic image from an output signal of the solid-state imaging device based on the photographing conditions, which is characterized by that the electronic camera has a band-width changing means for reducing the signal output rate for photographic signal output lower than the signal output rate for determining the photographing conditions and reducing the signal passing band-width narrower than that for determining the photographing conditions in the image signal path from the solid-state imaging device.

A second aspect of the electronic still camera according to the present invention is characterized by that the electronic camera is additionally so configured as to set the signal passing band-width of the image signal path is proportional to the signal output rate of the solid-state imaging device.

A third aspect of the electronic still camera according to the present invention is characterized by that the signal output rate is automatically changed in accordance with the exposure time in the photographing operation.

Additional objects and advantages according to the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation according to the present invention and many of the attendant advantages thereof will be readily obtained as the same becomes better understood by reference to the following detailed description when considered in connection with the accompanying drawings, wherein:

FIG. 3 is a graph showing comparison of the passing characteristics of the low-pass filters LPFa and LPFb, as shown in FIG. 2;

FIGS. 4A and 4B are circuit diagrams showing other examples of the low-pass filters used in the electronic still camera of the first embodiment according to the present invention; and FIGS. 5A to 5E are timing charts for explaining the operation of the electronic still camera of the second embodiment according to the present invention.

DESCRIPTION OF THE PREFERRED EMBODIMENTS

Referring now to the accompanying drawings, preferred embodiments according to the present invention will be described in detail.

FIGS. 1A to 1E are timing charts for explaining the operation of the first embodiment of the electronic still camera according to the present invention.

Figure 1:
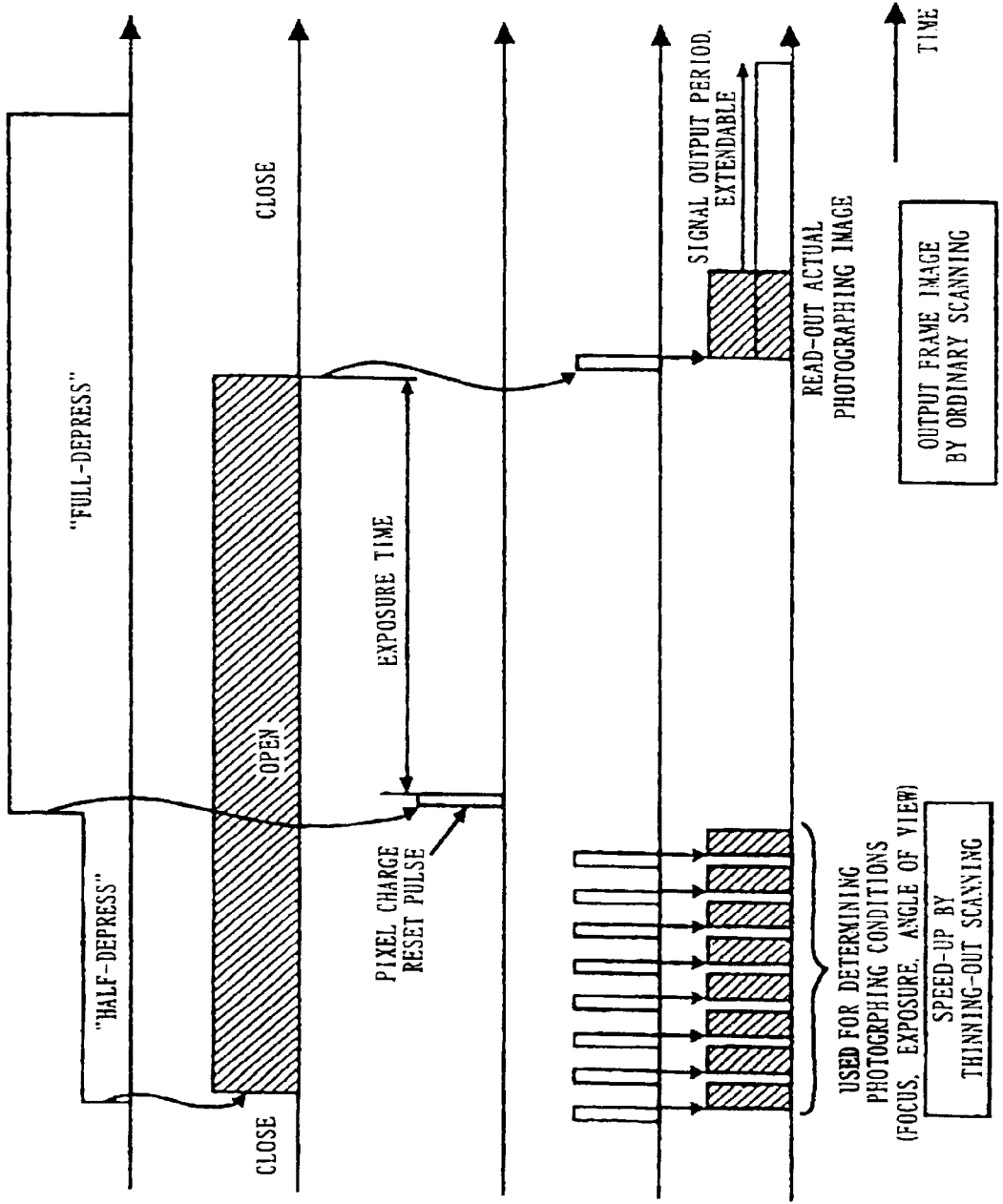
FIGS. 1A to 1E are timing charts for explaining the operation of the electronic still camera of the first embodiment according to the present invention.

In the drawings, FIG. 1A shows an operation change of a shutter button, FIG. 1B shows an operation change of an optical shutter, FIG. 1C shows an operation change of an electronic shutter, and FIG. 1D shows an output change of a CCD.

When the shutter button is "half-depressed" for the preparative photographing operation, the optical shutter is immediately put into the "Open" state, as shown in FIG. 1B. When the shutter button is "full-depressed" for the actual photographing operation, the optical shutter is put into the "closed" state when the exposure time set at the time of "half-depress" elapses.

When the shutter button is "full-depressed", an electronic shutter is operated instantaneously, as shown in FIG. 1C.

While the shutter button is "half-depressed", as shown in FIG. 1D, a plurality of pixel signal read-out pulses are applied to the CCD at a rate of 10 frames or more per second. Further, when the exposure time elapses in the "full-depress" state, one pixel signal read-out pulse is applied to the CCD.

According to the pixel signal read-out pulses, as shown in FIG. 1E, during the period of "half-depress", image signals continuing for a short duration period which are photo-electrically transduced by the CCD are obtained at a rate of 10 frames or more per second. On the other hand, after being "full-depressed", as described above, a image signal of one frame during a long duration period photo-electrically transduced by the CCD according to the pixel signal read-out pulses when the exposure time elapses which will be described later are output.

As described above, during the period of the shutter button being "half-depressed", images of 10 frames or more per second are read out from the solid-state imaging device, in a mode like a moving picture. These images are used for determining various photographing conditions such as focusing, exposure, angle of view, and others at respective frames.

When a camera operator depresses the shutter button at a stroke, the period of "half-depress" continues for a very short time. In order to obtain a plurality of frames for determining various photographing conditions in this short time, image signals read out from the CCD during the period of "half-depress" are short-time duration signals having a comparatively high rate.

On the other hand, an image signal read out from the CCD at the actual photographing operation is set so as to be a signal having a comparatively low rate, that is, a long-time duration signal. This is because that the actual photographing operation requires only one image, so that the signal output time from the CCD can be made longer, unlike the preparative photographing operation required to read a plurality of images in moving picture form. That is, it is because that the signal output rate can be made lower.

Figure 2:
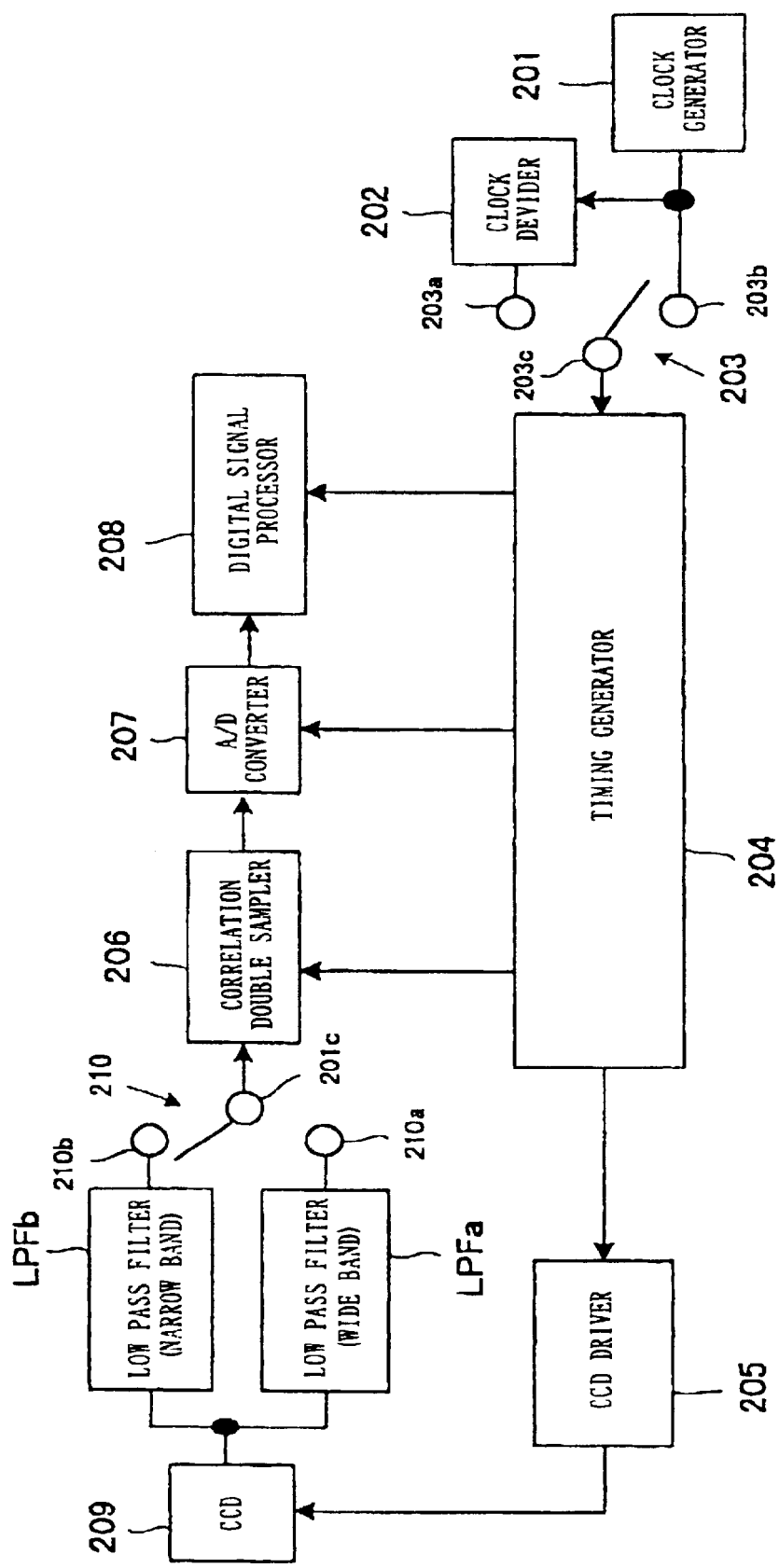
FIG. 2 is a block diagram showing the constitution of the electronic still camera of the first embodiment according to the present invention.

FIG. 2 is a block diagram for explaining the circuit construction of the first embodiment of the electronic still camera according to the present invention.

In FIG. 2, a clock (fundamental clock) CLo generated by a clock generator 201 is supplied to one input terminal 203a of a clock selector 203 via a clock divider 202. Also the clock CLo is directly supplied to the other input terminal 203b of the clock selector 203. Therefore, a different clock CLn divided by a predetermined division factor "n" is applied to the input terminal 203a of the clock selector 203. While the fundamental clock CLo is applied to the input terminal 203b of the clock selector 203. In the preparative photographing state with the shutter button being "half-depressed", the input terminal 203b is selected. While in the actual photographing state with the shutter button being "full-depressed", the input terminal 203a is selected. Therefore, in the preparative photographing state, the fundamental clock CLo is selected. On the other hand, in the actual photographing state, the dividing clock CLn is selected.

A clock selected by the clock selector 203 is applied to a timing generator 204 from an output terminal 203c thereof. The timing generator 204 generates various timing pulses based on the selected clock. Those timing pulses are applied to a CCD driver 205, a correlation double sampler 206, an analog-to-digital (A/D) converter 207, and a digital signal processor 208 respectively. The CCD driver 205 also reads out a image signal from the solid-state imaging device, for example, a CCD 209 based on the timing pulse applied thereto.

The image signal read out from the CCD 209 is applied to two low-pass filters LPFa and LPFb in parallel. The low-pass filter LPFa has a wide band pass characteristic and the low-pass filter LPFb has a narrow band pass characteristic.

Output signals of the low-pass filters LPFa and LPFb are applied to input terminals 210a and 210b of a band selector 210 respectively. A selected output signal by the band selector 210 is applied to the correlation double sampler 206 from an output terminal 210c thereof. The band selector 210 operates in connection with the shutter button operation of a two-stage operation shutter type in the same way as with the clock selector 203. In the preparative photographing state with the shutter button being "half-depressed", the input terminal 210a is selected and in the actual photographing state with the shutter button being "full-depressed", the input terminal 210b is selected.

Therefore, in the preparative photographing state, the image signal which is read out from the CCD 209 at a high rate and passes through the low-pass filter LPFa of the wide band pass characteristic is sequentially supplied to the correlation double sampler 206, the A/D converter 207, and the digital signal processor 208 via the band selector 210. In the actual photographing state, the image signal which is read out from the CCD 209 at a low rate and passes through the low-pass filter LPFb of the narrow band pass characteristic is sequentially supplied to the correlation double sampler 206, the A/D converter 207, and the digital signal processor 208 via the band selector 210.

FIG. 3 shows the comparison of the passing characteristics of the low-pass filters LPFa and LPFb. In FIG. 3, the vertical axis indicates noise power density and the horizontal axis indicates frequency. As shown in FIG. 3, the low-pass filter LPFa used in the preparative photographing state has a wide band pass characteristic and the low-pass filter LPFb used in the actual photographing state has a narrow band pass characteristic.

Generally, the noise energy amount of the low-pass filter is determined by the product of the noise power density and cut-off frequency, that is, the area enclosed by the passing characteristic line of the low-pass filter and the horizontal axis, as shown in FIG. 3. Therefore, the low-pass filter LPFa having the wide band pass characteristic has a large amount of passing noise energy, though it is suited to a high-speed operation. On the other hand, the low-pass filter LPFb having the narrow band pass characteristic has a small amount of passing noise energy and is suited to a low-speed operation.

Therefore, in the preparative photographing state, the image signal read out from the CCD 209 at a high rate passes through the low-pass filter LPFa of the wide band pass characteristic, so that although a comparatively large amount of noise energy is included in the image signal, a high frequency response characteristic is ensured. On the other hand, in the actual photographing state, a image signal read out from the CCD 209 at a low rate passes through the low-pass filter LPFb of the narrow band pass characteristic, so that the amount of noise energy included in the image signal is-reduced.

In the first embodiment, the two low-pass filters LPFa and LPFb having different band pass characteristics from each other are used, though only one low-pass filter with a variable or selectable signal passing band-width can be used.

FIGS. 4A and 4B show two examples of low-pass filters each having a variable or selectable switch signal passing band-width. The low-pass filters are comprised of a resistor R, two capacitors C1 and C2, and a switch S respectively.

In the example, as shown in FIG. 4A, its signal passing band-width is switched to the narrow band or the wide band depending on whether the capacitor C2 is connected to the capacitor C1 in parallel by the switch S or disconnected.

When the switch S is open, the cut-off frequency fcA(O) of the low-pass filter is given by the following expression (1).

$$fcA\ (O)=1/(2\pi C1R) \qquad (1)$$

When the switch S is closed, the cut-off frequency fcA(C) of the low-pass filter is given by the following expression (2).

$$fcA\ (C)=1/(2\pi(C1+C2)R) \qquad (2)$$

The cut-off frequency fc (O) given by expression (1) is higher than the cut-off frequency fc (C) given by expression (2). Accordingly, when the capacitor C2 is connected, the low-pass filter has the wide band pass characteristic. On the other hand, when the capacitor C2 is not connected, the low-pass filter has the narrow band pass characteristic.

In the example, as shown in FIG. 4B, the signal passing band-width is switched to the narrow band or the wide band depending on whether the capacitor C2 is connected in series with the capacitor C1 or short-circuited. When the switch S is open, the cut-off frequency fcB (O) of the low-pass filter is given by the following expression (3).

$$fcB\ (O)=(1/C1+1/C2)/(2\pi R) \qquad (3)$$

When the switch S is closed, the cut-off frequency fcB (C) of the low-pass filter is given by the following expression (4).

$$fcB\ (C)=1/(2\pi C1R) \qquad (4)$$

In both cases, when the switch S is closed, the passing band-width becomes narrower.

The cut-off frequency fcB (O) given by expression (3) is lower than the cut-off frequency fcB (C) given by expression (4). The cut-off frequency fcB (O) given by expression (3) is lower than the cut-off frequency fcB (C) given by expression (4). Accordingly, when the capacitor C2 is not short-circuited, the low-pass filter has a wide band pass characteristic. On the other hand, when the capacitor C2 is short-circuited, the low-pass filter has a narrow band pass characteristic.

In those examples, the low-pass filter passing band-width is changed by connecting or disconnecting a capacitor. However, it is obvious to those skilled in the art that the passing band-width can be also changed by connecting or disconnecting a resistor.

In this way, the image signal read out from the CCD 209 at the actual photographing operation is cut out noises at high frequencies by the narrow-band low-pass filter LPFb, and then applied to the correlation double sampler 206.

As is well known in the art, the correlation double sampler 206 performs the correlation double sampling operation for a image signal applied thereto, and thus reduces the noises. That is, the correlation double sampler 206 samples the reference voltage to be changed and a signal voltage generated on it respectively, and thus reduces the noises by taking off the difference between them. In the correlation double sampling operation, the wide band noise generated by the amplifier (not shown) for amplifying the image signal read out from the CCD 209 is folded on the frequency band effective as an image signal at the sampling operation and becomes a harmful noise. To cope with that, the correlation double sampler 206 is provided with a low-pass filter (not shown) having a cut-off frequency about three times of the signal transfer frequency on the input side thereof, so as to remove the noises in the high frequency band of the image signal before sampling, and thus enhancing the SN ratio.

Accordingly, the sample hold operation of the correlation double sampler 206 has an operation for folding the high frequency components on the low frequencies, as described above. Therefore, when a significant noise is contained in the high frequency band, it is included in the frequency band effective as an image signal. However, since the high frequency noise component of the input image signal is removed by the low-pass filter, no aliasing noise is generated and the noise amount included in the output of the correlation double sampler 206 is reduced. Therefore, the overall sensitivity of the electronic still camera according to the present invention is significantly improved.

However, when the read-out rate of a image signal from the CCD is lowered at the actual photographing operation as the first embodiment, following disadvantages still remain. That is, the retention time of the signal charge in the CCD is made inevitably longer. The leakage current varies at the PN junction of the CCD. And thus a fixed pattern noise increases due to those factors.

FIGS. 5A to 5E show timing charts in relation to the second embodiment of the electronic still camera according to the present invention which is capable of suppressing an increase in the fixed pattern noise caused by the variation of the leakage current, as described above.

As seen from FIGS. 5A to 5E, the second embodiment of the electronic still camera according to the present invention is able to reduce the fixed pattern noise caused by the variation of the leakage current by carrying out following sequence of operations. That is, the optical shutter is closed; the reading out of the image signal of the actual photographing operation from the CCD is finished; and then an at-dark pixel signal is read out for a time the same as the exposure time (i.e., an at-dark image integration period) after resetting the pixel charge by the electronic shutter operation with the optical shutter kept closed, and a dark image signal obtained at this time is subtracted from the image obtained at the actual photographing operation.

According to the above operations, an increase of the fixed pattern noise caused by the variation of the leakage current at the PN junction of the CCD can be suppressed.

As described above, the present invention can provide an extremely preferable electronic still camera which effectively reduces noises in image signals obtained at an actual photographing operation.

While there have been illustrated and described what are at present considered to be preferred embodiments according to the present invention, it will be understood by those skilled in the art that various changes and modifications may be made, and equivalents may be substituted for elements thereof without departing from the true scope according to the present invention. In addition, many modifications may be made to adapt a particular situation or material to the teaching according to the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An electronic still camera for determining photographing conditions from an output of a solid-state imaging device by a preparative photographing operation prior to an actual photographing and generating an actual photographing image from an output signal of the solid-state imaging device based on the photographing conditions, comprising:

a solid-state imaging device;

means for reducing a read-out rate of a image signal from the solid-state imaging device at the actual photographing operation lower than a read-out rate of a image signal from the solid-state imaging device at the preparative photographing operation; and band-width changing means for reducing a signal passing band-width at the actual photographing operation narrower than a signal passing band-width at the preparative photographing operation in a image signal path from the solid-state imaging device.

2. An electronic still camera according to claim 1, wherein the signal passing band-width of the band-width changing means is in proportion to the read-out rate of a image signal from the solid-state imaging device.

3. An electronic still camera according to claim 1, wherein the signal read-out rate at the actual photographing operation is automatically switched depending on an exposure time at the actual photographing operation.

* * * * *